Figure 2:
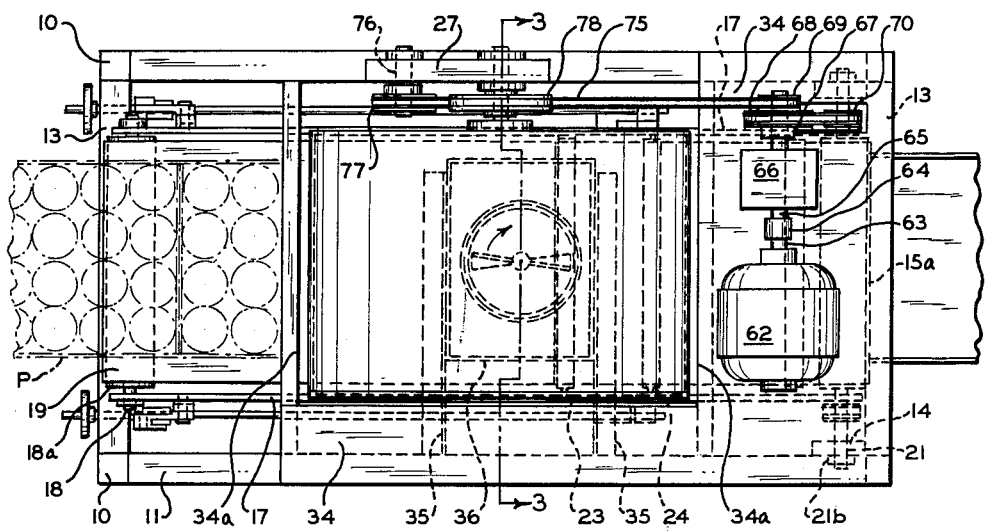

July 30, 1963  C. W. PETERSEN ETAL  3,099,360
DEPANNING APPARATUS
Filed Jan. 26, 1959  2 Sheets-Sheet 1

INVENTORS
CONRAD W. PETERSEN
HENRY A. HEIDE

ATTORNEYS

INVENTORS
CONRAD W. PETERSEN
HENRY A. HEIDE

ATTORNEYS

United States Patent Office 3,099,360
Patented July 30, 1963

3,099,360
DEPANNING APPARATUS
Conrad W. Petersen and Henry A. Heide, Saginaw, Mich., assignors to Baker Perkins Inc., Saginaw, Mich., a corporation of New York
Filed Jan. 26, 1959, Ser. No. 788,848
10 Claims. (Cl. 214—309)

This invention relates to depanning apparatus and more particularly to a depanning machine of practical and compact construction which can be installed in a production line in a bakery or the like for separating buns and other products from the pans in which they are baked, and carrying them to one conveyor for transport to a place of further processing, as the pans are moved to another conveyor for return to the production line.

The buns, as they are received by the machine from the oven or cooler, are, of course, warm and soft and must be handled with considerable care. Also, it is desirable that they proceed away from the depanning machine on a conveyor in rows in which they are in substantially abreast relation to facilitate further processing. Briefly, the instant invention is concerned with means for lifting the buns from the pans, and with means for transferring the buns from the lifting means to a conveying surface in substantially transversely aligned arrangement.

Bun depanners of the type which separate the buns by inverting the pans and jarring the buns loose have many disadvantages which are overcome by the present machine. Aside from the fact that many buns which are jarred from their pans to a conveying surface will be found to have cracked crusts as a result, frequently the pans are damaged in such depanning operations and must be replaced. Further, impact separation by its very nature requires the employment of additional mechanism for righting the buns and for arranging them in abreast rows, since impact separation tends to scatter the buns in all directions.

It is a prime object of the present invention to provide a depanning machine which handles both the buns and the pans gently while effecting their separation, and retains the buns in alignment while transferring them surely and efficiently to a discharging conveyor. When a machine manufactured in accordance with the present invention, in which the buns are depanned in upright condition, is in use, none of the buns ever fall from the machine to the floor, nor are the buns creased, marked, or otherwise deformed or damaged. Furthermore, being depanned in an upright position and so delivered to the conveyor following, the product can be conveyed for cooling and subsequent processing without subjecting the tender top of the bun to condensation, unsightly marking and other damage inherently resulting from conveying the product in dearranged and inverted positions.

It is a further important object of the invention to provide a depanning machine which enhances or promotes the use of other automatic processing equipment in a bakery because it efficiently delivers buns in aligned relationship and conveys the pans to a point of discharge which can, in cooperation with another conveyor, return them to the production line without any need of intermediately handling them.

It is also a further important object of the present invention to provide a depanning machine which will not only accomplish results set forth above as objects of the invention, but specifically to do so at production speeds in the upper range of those presently attainable with other production equipment available to the industry. The instant invention is intended for use at production rates up to and even exceeding 300 pieces per minute.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

Figure 1:
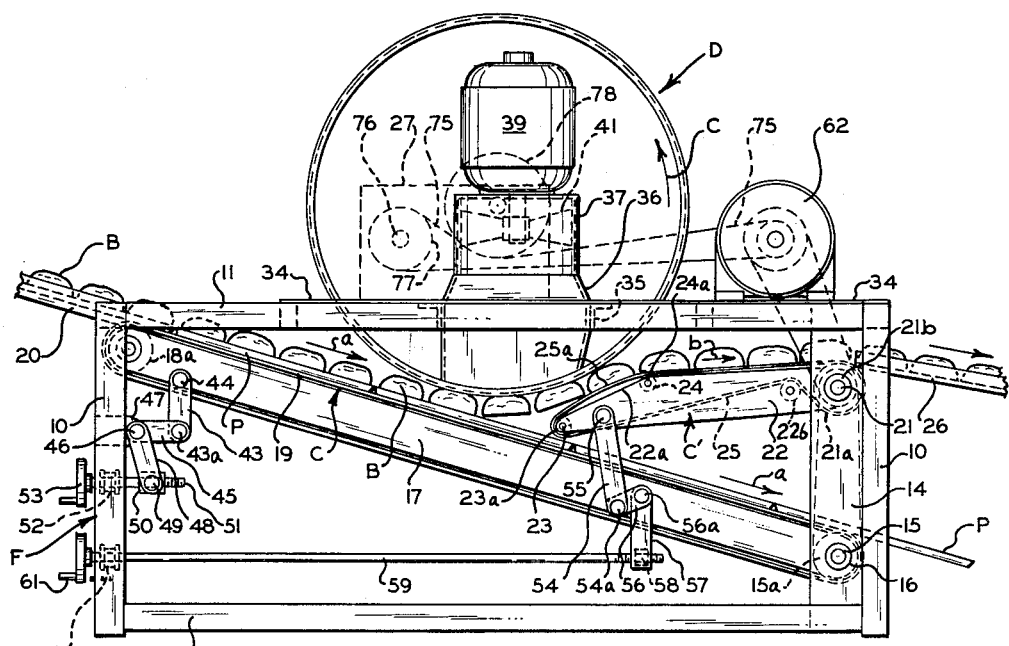
Figure 3:
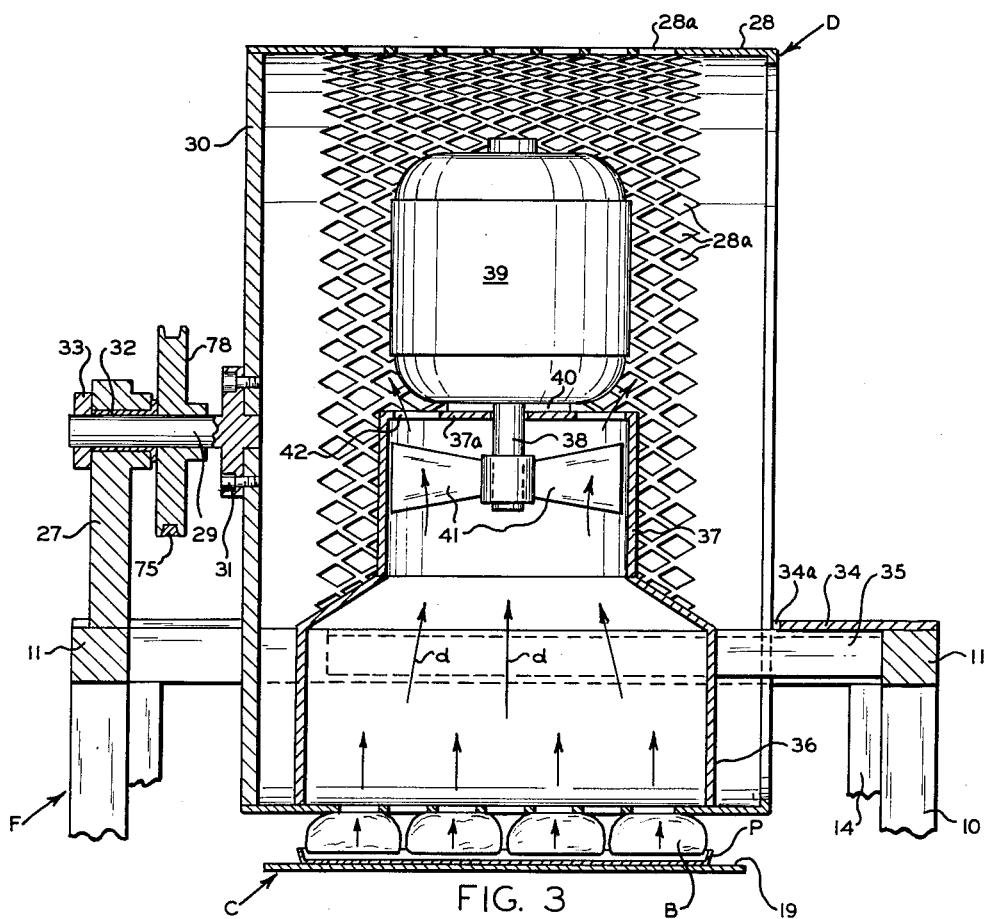
Figure 4:
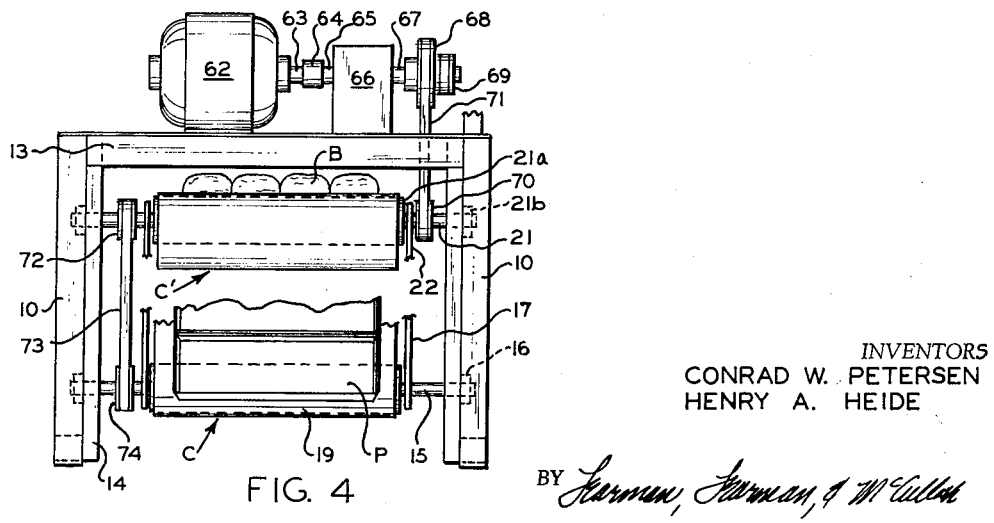

In the drawings:
FIGURE 1 is a side elevational view of our depanner, illustrating the manner in which the buns are lifted from the pans and transferred to a discharge conveyor;
FIGURE 2 is a top plan view of the machine with the surface of the drum shown as unbroken for the sake of convenience of illustration;
FIGURE 3 is an enlarged, transverse, sectional view taken on the line 3—3 of FIGURE 2; and
FIGURE 4 is a rear end elevational view taken from the discharge end of the machine, with certain elements of the machine being omitted in the interest of clarity.

Referring now more particularly to the accompanying drawings in which only a preferred embodiment of the invention is depicted, a letter F generally indicates the frame of the machine, which can be of any desired construction, but which is shown as comprising corner posts or frame members 10, connected by upper and lower side frame members 11 and 12, respectively, and upper end frame members 13. A downwardly inclined, pivotally supported conveyor C extends substantially the full length of the frame F, and provided adjacent the corner posts 10 at the discharge end of the machine are vertically disposed bearing plates 14 which pass the trunnions or shaft ends 15 of the rear conveyor roll 15a which is journaled at its ends in bearings 16. Spaced apart conveyor side plate members 17 are pivotally or rockably supported on the shaft ends 15 and at their front ends revolvably support the shaft ends of trunnions 18 of the front conveyor roll member 18a as shown. Trained around the front and rear rolls 15a and 18a, respectively, and driven in the direction indicated by the arrows "a" is an endless belt 19 which transports the pans from front to rear as shown. An inclined feed chute 20 or cooperating feed conveyor system from the oven may be fixed to the upper end frame member 13 at the front of the machine (FIGURE 1) to deliver the pans P to the conveyor C.

Also pivotally supported in position is a second conveyor C' which has the trunnions or shaft ends 21 of its rear conveyor roll 21a journaled in bearings 21b. Similar conveyor side plates 22 are pivotally or rockably mounted on the shaft ends or trunnions 21 and at their front ends journal the shaft ends or trunnions 23 of the front roll 23a. It will be seen that the front ends of the side plates 22 are reduced as at 22a and a conveyor roll 24a having extending roller trunnions or shafts 24 is supported by the plates 22 intermediate the front and rear conveyor rolls 23a and 21a. Relatively loosely trained around the rolls 21a, 24a, and 23a, and a snubber roll 22b, for a purpose which will later become apparent, is a light weight, cotton belt 25 which delivers the buns B, after they have been removed from pans P, to a discharge chute 26 or cooperating discharge conveyor which can be secured to end frame member 13 at the discharge end of the machine. The upper run of conveyor C' moves in the direction indicated by the arrow "b" and in a manner which will be presently described assists in transferring the buns B.

Intermediate the ends of conveyor C on a bearing post 27 mounted on one of the upper side frame members 11 is a revolvable drum member D (FIGURES 1 and 3) having a peripheral plate 28 with a perforate or mesh portion 28a (FIGURE 3) which passes adjacent the upper run of conveyor C and the adjacent inclined portion of the upper run of conveyor C', the drum D being driven in the direction indicated by arrow "c." The drum D has a trunnion shaft 29 fixed to one end 30 of the drum by bolts 31 or the like and it will be seen that the bearing post 27 carries a bushing 32 and a bushing retainer 33 so that the drum D, which is mounted in overhung relation, will be suitably supported for revolution at a relatively slow speed. The peripheral surface of the drum D and the belt of the takeoff conveyor C' are driven at substantially the same speed, which may be about 85 feet per minute, whereas the pan conveyor belt 19 is driven at a somewhat slower speed which, when the speed of the drum and takeoff belt is 85 feet per minute, will be about 60 feet per minute. Thus the revolution of the drum D will be a factor in the removal of the buns from the pans. The speeds of the drum surface and conveyor belts are retained in proper proportion by the driving means employed and the speeds can be changed to suit the user's requirements by means of a conventional variable speed motor control.

Mounted on the top of the frame F is a top plate or cover member 34 which has an opening 34a admitting the drum D as shown.

Angle members 35 fixed to the one side frame member 11 and the top plate 34 (see FIGURES 2 and 3) extend transversely in through the opposite open end of the drum D to support a tube 36 which is of generally rectangular cross section at its lower end in fixed relation within the revolving drum D. The lower end of tube 36 is arcuately shaped to conform to the inner peripheral surface of plate 28 (see FIGURE 1) but is mounted so that it is just out of contact with this revolving surface. Communicating with the top of tube 36 is a fan housing 37 of annular configuration having a top wall 37a in which the armature shaft 38 of a motor 39 is journaled, the motor 39 being mounted on a plate 40 secured to the top wall 37a of the fan housing 37. The fan blades 41 which are fixed on the shaft 38 are conventional suction fan blades and, when revolved, produce a suction within tube 36 as indicated by the arrows "d" which lifts the buns from the underlying pan P to the screen surface 28a of the revolving drum D.

While the actual suction produced by the rapidly rotating blades 41 may be only in the neighborhood of 8 inches of water, the air movement in tube 36 may approach 3000 feet per minute. Openings 42 are provided in the top wall 37a of the fan housing 37 to pass the air stream which is then free to exit from the drum D through the upper portion of the screen surface 28a and through the open end of the drum. While the particular suction developed is not critical, it is desired that the draft be sufficient to arch the portion 25a of the light weight belt 25 between rolls 23a and 24a outwardly substantially beyond linearity toward the peripheral surface 28a of the drum D as shown in FIGURE 1 and there must, of course, be sufficient slack in belt 25 to permit this portion of the belt to assume the position shown. The suction developed by the fan blades 41 should then desirably be sufficient in view of the weight of belt 25 to take up substantially all the slack in the belt 25 and form an arched portion which will cooperate with the peripheral surface of the drum D to transfer the buns B to the belt 25.

The position of conveyors C and C' is important, of course, and must be changed to accommodate different buns which it might be desired to depan. The upper end of the conveyor C is supported in a particular position by links 43 pivotally joined to the conveyor side plates 17 by pins 44 and links 43 are rigidly connected by members 43a to links 45 which are themselves fixed fast to shafts 46 which are pivotally supported by brackets 47. Links 48 connected fast to the shafts 46 are pivotally joined as at 49 to nuts 50 on threaded control shafts 51 which are fixed by bearings 52 against axial movement but are revolvable manually when hand wheels 53 are operated. Movement of the nuts 50 axially on shafts 51, of course, rotates shafts 46 and either raises or lowers the front end of conveyor C about the trunnions 15 as desired.

Similar mechanism is employed to support the front end of conveyor C' and links 54 connected pivotally to the conveyor plates 22 by pins 55 are fixed fast to links 56 by members 54a. The links 57 which are joined fast to links 56 by members 56a carry the nuts 58 through which the control shafts 59 are threaded and, as previously, bearings 60 prevent axial movement of shafts 59 while permitting their rotation upon operation of the hand wheels 61. Clearly the movement of links 57 axially with respect to shafts 59 will raise or lower conveyor C' about the shaft ends 21 as desired.

A single drive motor 62 can be employed to drive both conveyors C and C', and also the drum D, as shown in FIGURES 1, 2, and 4. The armature shaft 63 of motor 62 is coupled at 64 to the input shaft 65 of a speed reducer 66 which has an output shaft 67 of extended length on which a pair of drive pulleys 68 and 69 are keyed. The drive pulley 68 drives a pulley 70 fixed on one of the conveyor C' trunnions 21 through the medium of a belt 71, and also, by means of a pulley 72 fixed on the opposite shaft end 21 and connected by a belt 73 to a similar pulley 74 keyed on one of the trunnions 15, drives the conveyor C. Cooperating with the drive pulley 69 to support a belt 75 is a stub shaft 76, journaled by bearing plate 27, which mounts a pulley 77. The belt 75, as shown in FIGURE 1, drives the pulley 78 which is keyed on the drum shaft 29.

In operation the conveyor C is so positioned relative to the drum D that the peripheral surface 28a of the drum clears the tops of the buns B as they arrive at the front wall of the fixed tube 36 on their journey in pans P down the conveyor C. At this point the suction exerted as a result of rotation of the fan blades 41, together with the revolution of the drum D at a slightly greater speed, operates to gently lift the buns B from the pans which continue downwardly on conveyor C. The buns B move on the drum's peripheral surface 28a to a location adjacent the rear wall of tube 36 where they are to be removed to the discharging conveyor C'. At this point the force of the air rushing between conveyor C' and the drum D to the mouth of tube 36 acts to retard or prevent further forward movement of the buns. However, since the outwardly arched portion 25a of the light weight belt 25 is spaced from the periphery of the drum D at its nearest point a distance which is slightly less than the height of the buns, the buns will be subjected to a delicate pressure by the belt 25a at substantially the rear wall of tube 36 and this slight pinching action between the moving surfaces 28a and 25a will carry the buns through and transfer them to the belt 25 of conveyor C' in proper position and alignment. This unique manner of retaining the product, which is affected by the force of the air flow proceeding toward tube 36, removes each of the buns in a row, and each row of buns, from the drum at substantially the same point in the drum's angular rotation. Further, one bun or row of buns is prevented from being carried further on the drum that others which except for belt section 25a might have been held up by the force of the air flow. As a consequence there is no danger of buns which might not have been detained by the air flow in the same way as preceding buns dripping on the preceding buns as they are carried away on conveyor belt 25. The buns will be transferred to the conveyor belt 25 in abreast relationship whether the buns being processed are joined in clusters or are individual.

It should be apparent that we have perfected depanning apparatus which will operate reliably and efficiently to accomplish the objects of the invention and it is to be understood that various equivalent elements may be substituted for the various elements described to perform the same or similar functions without departing from

We claim:

1. In apparatus for depanning buns and like products: downwardly inclined first conveyor means for carrying a pan with buns forwardly; upwardly inclined, diverging endless conveying means interjacent the ends of said first conveyor means and spaced therefrom sufficiently to permit passage of a pan therebetween on said first conveyor means; a revolvable perforate drum journaled to pass its periphery adjacent both said first conveyor means and endless conveying means; a radially extending tube fixed relative to said drum, but lying within said drum, having an open end of such dimension as to overlie a portion of both said first conveyor means and endless conveying means, said tube terminating adjacent the inner periphery of the drum; means connected with the opposite end of said tube exerting a suction which lifts said buns from the pan to the peripheral surface of said drum; means revolving said drum to carry said buns to the rear side of said tube; said suction arching said endless conveying means toward the surface of said drum at the rear side of said tube so that the said endless conveying means, in retaining said buns between itself and the surface of said drum at substantially the rear side of said tube, removes the buns from the surface of the drum at a predetermined point and carries them away on said endless conveying means; and means driving the adjacent run of said endless conveying means in the same direction as the peripheral surface of the drum moves.

2. The combination defined in claim 1 in which said first conveyor means is an endless conveyor with its run adjacent said drum driven in the same direction as the peripheral surface of the drum.

3. The combination defined in claim 1 in which suction fan means supported within said drum communicates with said tube.

4. The combination defined in claim 1 in which each of said first conveyor means and endless conveying means is mounted for pivotal movement at an end remote from said drum; and means is provided for holding both said means in various positions spaced from the peripheral surface of the drum.

5. In apparatus for depanning buns and the like; a forwardly extending first conveyor means portion for forwardly transporting pans with buns; second conveyor means including a lightweight, endless conveyor belt having a portion adjacent to and in generally divergent relationship with said first conveyor means portion but spaced therefrom to permit travel of the pans therebetween, and support members for said belt spaced to provide a substantial slack in said belt; a perforate member movable in a path of travel adjacent and generally parallel to said first conveyor means portion and adjacent and generally parallel to said portion of the second conveyor means; suction producing means, including a suction tube means on the side of said perforate member remote from said generally divergent first and second conveyor means portions and overlying a substantial portion of the adjacent sections of both said first and second conveyor means portions, lifting said buns from the pans to said perforate member, and lifting a portion of said slack belt toward said perforate member to exert a delicate pressure against buns carried by said perforate member and grip said buns and carry them against the rush of said air far enough from said suction tube to permit them to transfer in abreast alignment to said second conveyor means.

6. In apparatus for depanning buns and the like; support means for pans with buns; a takeoff conveyor assembly including pressure exerting means having a portion adjacent to said support means but spaced therefrom; a perforate member movable in a path of travel adjacent and generally parallel to said support means and adjacent and generally parallel to said pressure exerting means; said pressure exerting means being movable toward said perforate member from a more remote position; suction producing means, including a suction tube on the side of said perforate member remote from said support means and conveyor assembly overlying a substantial portion of the support means and lifting said buns from the pans to said perforate member, said pressure exerting means being moved inwardly toward said perforate member to reduce the space therebetween and exert a delicate pressure against buns carried by said perforate member to carry them against the rush of said air far enough from said suction tube to permit them to transfer in abreast alignment to said takeoff conveyor assembly.

7. In apparatus for depanning buns and the like; means for supporting a pan with buns; an inclined conveying assembly located adjacent thereto and at least in part movable in a direction of travel away from said means; a movable member mounted above said means and assembly to move in the direction of travel of said conveying assembly to pass a surface adjacent the pan and the inclined conveying assembly; said conveying assembly including a portion displaceable from said direction of travel of said portion of the conveying assembly toward said movable member; and means within said movable member exerting a suction which lifts said buns from the pan to the movable member and moves said portion of the conveying assembly toward said movable member to aid the removal of said buns from the surface of the movable member to the conveying assembly.

8. In apparatus for depanning buns and the like; forwardly extending first endless conveyor means for forwardly transporting pans with buns; a perforate member movable in a path of travel adjacent said first conveyor means and away therefrom; means associated with said perforate member exerting a fluid pressure lifting force acting to lift said buns from the pans to the said perforate member; means driving said first conveyor means and perforate member, driving said first endless conveyor means at a slower surface speed than said perforate member so that the greater speed of the perforate member aids separation of the buns from the pans; second endless conveyor means, including a portion adjacent to and in generally divergent relationship with said first conveyor means but spaced therefrom to permit travel of the pans therebetween; said means associated with said perforate member exerting a fluid pressure lifting force comprising tubular means fixed in position relative to said perforate member extending to the side thereof remote from said first conveyor means and suction fan means connecting with said tubular means; said second conveyor means comprising an endless, fabric conveyor belt, and belt support and drive members, with the belt loosely trained around said support and drive members to provide a slack therein; said belt having at least a portion of a run extending along the path of said perforate member which is arched outwardly by the suction to grip the buns and aid in removing them from the perforate member to said second conveyor means.

9. In apparatus for depanning baked products; a forwardly extending, generally longitudinally disposed first conveyor means portion for forwardly transporting pans containing the product; a second conveyor means portion, movable in a generally longitudinal path of travel, having a section adjacent to and in generally divergent relationship with said first conveyor means portion but spaced therefrom to permit travel of the pans therebetween; perforate conveyor means having an endless surface movable in a generally longitudinal path of travel adjacent and generally parallel to said first conveyor means portion and adjacent and generally parallel to said section of the second conveyor means portion; suction producing means, including a suction box means on the side of said perforate conveyor means remote from said first and second conveyor means portions and overlying a substantial portion of the adjacent sections of both said first and second conveyor means portions, for lifting said product from the pans to said perforate conveyor means, one of said endless perforate conveyor means and second conveyor means section being displaceable in a generally vertical direction away from the direction of its travel and the normal spacing between them being less near the front of said suction box than would freely accommodate the product so that the product is gripped with a delicate pressure and discharged from said perforate conveyor means to transfer in transverse alignment to said second conveyor means portion.

10. In apparatus for depanning baked products; a forwardly extending, generally longitudinally disposed first conveyor means portion for forwardly transporting pans containing the product; a second conveyor means portion, movable in a generally longitudinal path of travel, having a first section adjacent to and in generally divergent relationship with said first conveyor means portion but spaced therefrom to permit travel of the pans therebetween and a second longitudinally disposed section leading generally horizontally therefrom; perforate conveyor means having an endless surface movable in a generally longitudinal path of travel adjacent and generally parallel to said first conveyor means portion and adjacent and generally parallel to said first section of the second conveyor means portion; suction producing means, including a suction box means on the side of said perforate conveyor means remote from said first and second conveyor means portions and overlying a substantial portion of the first conveyor means portion and first section of the second conveyor means portion, for lifting said product from the pans to said perforate conveyor means, one of said endless perforate conveyor means and second conveyor means first section being displaceable in a generally vertical direction away from its direction of travel and the normal spacing between them near the juncture of said first and second sections of the second conveyor means portion being less than would freely accommodate the product so that the product is gripped with a delicate pressure and discharged from said perforate conveyor means to transfer in transverse alignment to said second conveyor means portion.

References Cited in the file of this patent

UNITED STATES PATENTS

| | | |
|---|---|---|
| 1,377,136 | Lawrence et al. | May 3, 1921 |
| 1,770,222 | MacManus | July 8, 1930 |
| 1,945,886 | Den Boer | Feb. 6, 1934 |
| 2,445,884 | MacManus | July 27, 1948 |
| 2,758,731 | Davis | Aug. 14, 1956 |
| 2,975,920 | Reed et al. | Mar. 21, 1961 |

FOREIGN PATENTS

| | | |
|---|---|---|
| 908,962 | Germany | Apr. 12, 1954 |